Nov. 23, 1954
G. U. BRUMBAUGH
2,694,943
SHIFT CONTROL TOWER
Filed June 15, 1951
2 Sheets-Sheet 1
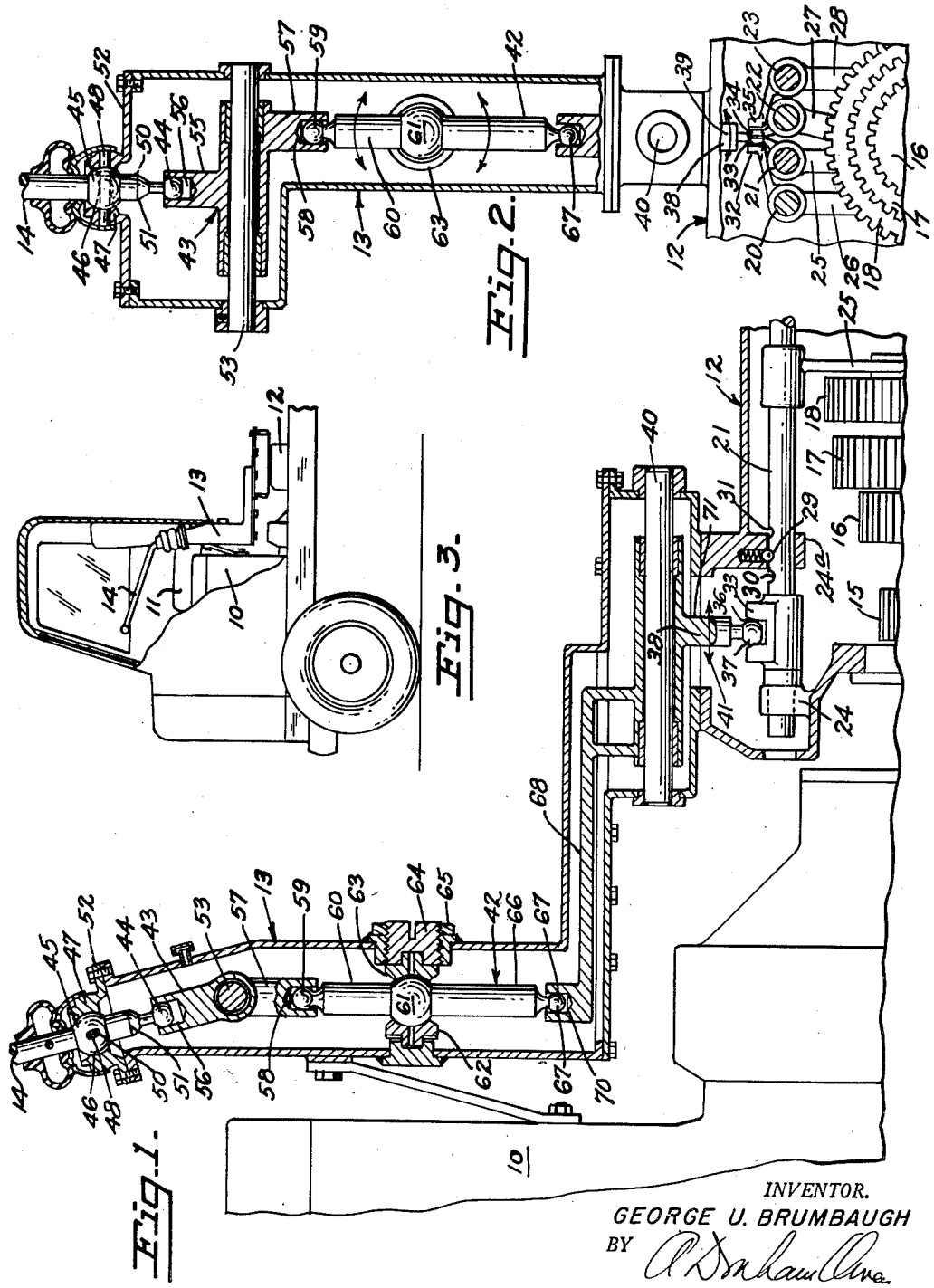
INVENTOR.
GEORGE U. BRUMBAUGH
BY
ATTORNEY

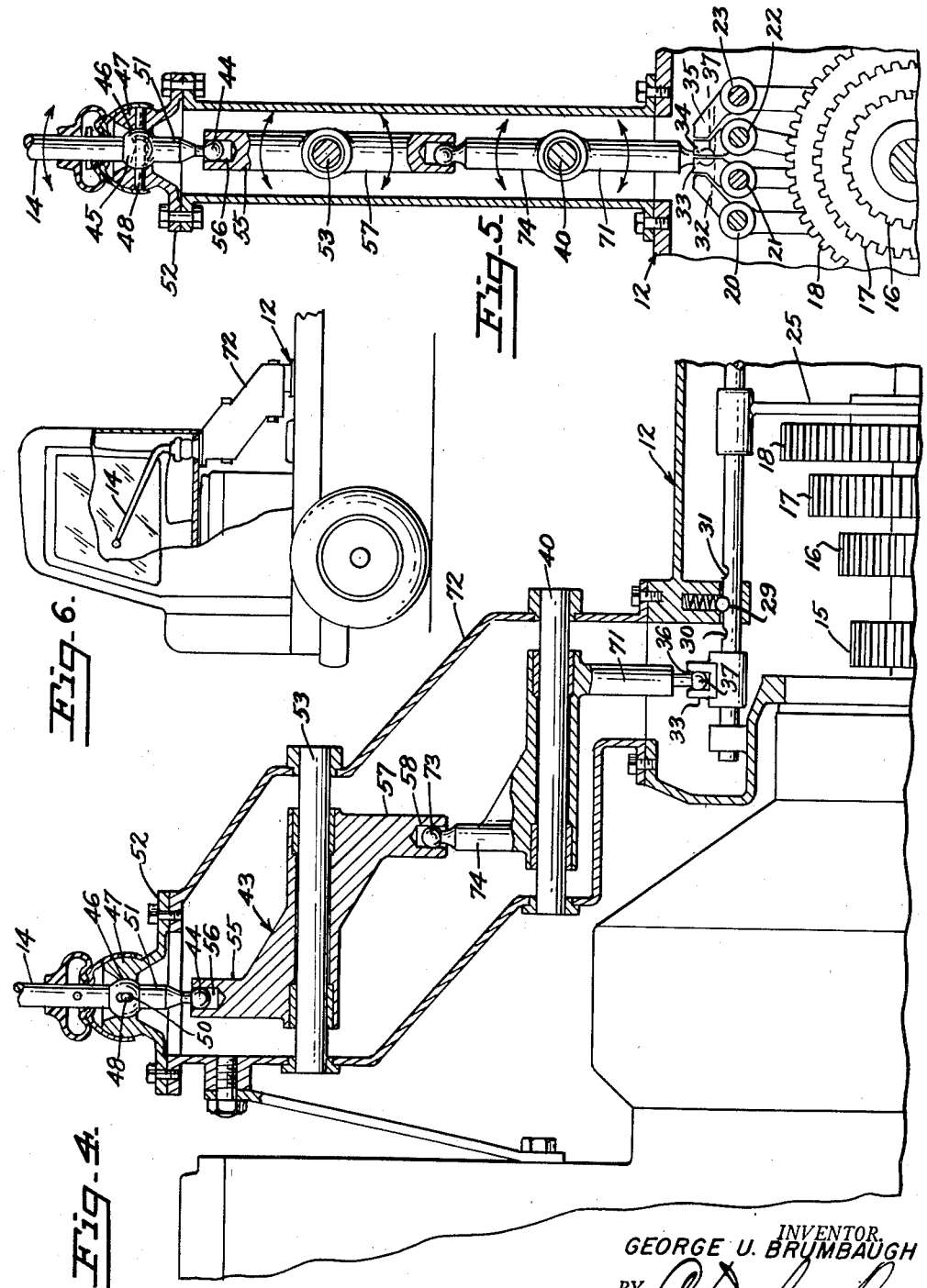

United States Patent Office 2,694,943
Patented Nov. 23, 1954

2,694,943

SHIFT CONTROL TOWER

George U. Brumbaugh, Palo Alto, Calif., assignor to Peterbilt Motors Company, Oakland, Calif., a corporation of California Application June 15, 1951, Serial No. 231,861

5 Claims. (Cl. 74—473)

This invention relates to an improvement in remote control mechanisms for multiple speed transmissions.

In particular the invention represents an improved solution of the perplexing problem of arranging a transmission gear shift lever in a position convenient to the driver where the transmission is at a remote location. Heretofore such devices have lacked in certainty of operation, or have had two characteristics, which are called in the trade a "rubbery feel" and a "sloppy action." The clearances and movements of the gears and the shifting bars in a transmission are delicate and unless there is freedom from lost motion (the sloppy action) and from the springy rubbery action, the driver is handicapped in shifting through the gears. Sometimes these actions are so pronounced, due to torsion and looseness in the remote shifting means, that the driver is unable to complete a shift into one or more of the gear ratios provided in the transmission, or he may get the transmission locked up.

These devices are used mostly in trucks and tractors for hauling heavy pay loads over the highways where any delay in schedule is costly to the operator and to the customer whose freight is in transit. One of the advantages of the present invention is that it has completely removed the troubles experienced with current and with earlier forms of remote control shifting devices and even though only recently put on sale, the owners of earlier devices have requested that the present device be installed to replace the older forms.

Among the objects of the present invention are the following: to provide a positive sensitive remote control shifter; to provide a shift tower that can, if necessary, go around other truck or body parts instead of having to have the shift lever in direct vertical alignment with the shifter bars in the transmission; to provide a shift tower especially adapted to the cab-over-engine type of truck where the driver's position is above the engine and well forward of the transmission; and to provide a shift tower that is simple and relatively inexpensive to build and that requires no special servicing to maintain it at top efficiency.

The integral compact nature of the present invention is important for several reasons. First, that to install it requires no brackets; second, that it does not cover up and make inaccessible for servicing other parts of the engine; third, that the positive relation between the moving parts reduces torsion and looseness to a minimum; and fourth, that by positioning the shift lever pivot to the rear of the engine and coming forward over the top of the engine, crowding of the driver's compartment in the vicinity of his right leg and foot is avoided.

Other objects and advantages will become apparent as this description of two preferred forms of the device proceeds. In the drawings:

Fig. 1 is a view in elevation and partly in cross-section showing the shift control tower mounted on a transmission and shaped to extend up behind the engine block to a position handy to the driver's seat;

Fig. 2 is a like view showing the device of Fig. 1 as seen from the back;

Fig. 3 is a diagrammatic view of the side of the front end of a cab-over-engine truck showing the device of Figs. 1 and 2 in relation to the other parts of the vehicle;

Figs. 4, 5, and 6 are like views respectively to Figs. 1, 2, and 3 showing a modified form of the device.

Referring to Fig. 3 showing the front portion of a truck or tractor, the engine is shown at 10, the driver's seat at 11, the transmission at 12, and the shift tower assembly at 13. The shift lever 14 extends into a convenient position beside the driver.

In the transmission 12 are the gears 15, 16, 17 and 18. Those gears with which they mesh are not shown. Extending fore and aft in the transmission housing are a plurality of shafts 20, 21, 22 and 23 slidably mounted in suitable bearings like 24, 24a in the transmission housing. There may be fewer shafts depending upon the number of different gear ratios in the transmission. A shifting fork or yoke depends from and is secured rigidly to each of the shafts 20 to 23 inclusive. One is shown in Fig. 1 at 25 secured to the shaft 21. Others are shown at 26, 27 and 28 in Fig. 2. Each fork engages in an annular groove in its respective gear or clutch member and functions to move its respective gear whenever its shaft is moved fore or aft. A spring pressed detent 29 is provided for each shaft and is adapted to engage a notch 30 or 31 when the shaft is in one or the other of its operative positions. To function properly the detent 29 for each shaft must be in its proper notch 30 or 31. It is not proper that any shaft should be shifted only far enough that its detent 29 will remain riding up on the round part of the shaft. If the detent 29 does not get into a notch the gear controlled by the related fork (such as 18 is by the fork 25), may work out of engagement. This is known as the transmission slipping out of gear. Another trouble too is that in coming out of gear, if the shaft 21, for example, is not moved far enough for the detent to engage in the notch 31, the shift lever finger will not come up to neutral position and therefore cannot be shifted sidewise to select another gear.

Both of these problems arise where the remote control shifting mechanism is rubbery and has so much lost motion due to torsion or other cause. For example, the driver may move the shift lever to move the shaft 21 to move the gear 18; but if there is a loose rubbery connection between the shift lever 14 and the shaft 21, a full movement of the shift lever may only move the shaft 21 to where the detent 29 is lifted out of the notch 31, but not far enough for the detent 29 to drop into one of the notches 30. Thus the gear is not locked in position and trouble follows.

On each shaft 20, 21, 22 and 23 is rigidly secured a member 32, 33, 34, and 35, each with a slot extending across it. The slot 36 in the member 33 shows in Fig. 1. The slots are aligned when the detent 29 on each shaft 20, 21, 22 and 23 is in the notch 31 on each shaft. Each slot is wide enough fore and aft, as well as sideways, to receive the shift finger ball 37 within it. The ball 37 is usually a ball with the sides machined off and is mounted on the lower arm of the bell crank lever 38 so that its sidewise movement is in the direction of the arrow 39 in Fig. 2. The lever 38 is slidably mounted on the bell-crank shaft 40 so that its fore and aft movement is in the direction of the arrow 41 in Fig. 1. The members 32 and 35 are shaped to bring their respective slots 36 within the range of sidewise movement of the shift finger ball 37 so that the driver can place the ball 37 in the slot 36 in any one of the members 32, 33, 34, or 35. When so placed, the driver can shift the chosen member 32, 33, 34, or 35 and its respective shaft 20, 21, 22 and 23 and its associated shifting fork fore or aft to engage the gears desired.

The improvement of the present invention deals with the mechanism by which the shift finger ball 37 can be moved sidewise, or fore and aft from a remote position adjacent the driver's seat 11, by moving the shift lever 14.

At shown in Figs. 1 and 2, the positive, shifting mechanism employs a plurality of levers 38, 42, 43 and 14. By combining the ball mounted levers 14 and 42 with the shaft mounted slidable levers 38 and 43 many desirable effects are obtained, including the effect of having the shift finger ball 37 move in the same direction and by any desired proportional amount as the ball 44 on the end of the shift lever 14. Other advantages have been referred to before, such as the fact that this movement has no appreciable lost motion or rubbery feeling so that the slightest movement of the ball 44 is immediately translated in a like movement of the ball 37.

Working from the top down, the shift lever 14 has an enlarged ball-like part 45 rockably mounted in the bore 46 of the cap 47 by a pin 48 which fits in a slot 50 in the ball 45. This permits the shift lever to be moved fore and aft or to be rocked sidewise without any rotation of the ball 45 about the axis of the lever. In this way the end of the lever 14 engaged by the operator can extend forward at an angle to that portion of the lever which carries the ball-like part 45. Beneath the ball 45 the shift lever arm 51 carries the ball 44. As sold by the transmission maker, the shift lever 14, the cap 47 and its flange 52 are made to fit on the transmission case 12 so the ball 44 will occupy the position the ball 37 occupies in Fig. 1. The present invention makes it possible to place the shift tower 13 on the transmission case 12 and then to place the shift lever 14, cap 47, and flange 52 on top of the shift tower 13. There may be cases where clearance requirements may call for a specially made cap.

Near the top of the shift tower is mounted a cross shaft 53 on which is slidably supported the lever 43 having an upper arm 55 with a socket 56 to receive the ball 44 and having a lower arm 57 with a socket 58 to receive the ball 59 on the upper arm 60 of the ball-mounted lever 42. This lever 42 is mounted for universal movement by means of its ball portion 61 and the supporting bearing socket members 62 and 63. The latter are adapted for close adjustment by means of the screw threaded adjustment plug 64 with its lock nut 65. The lower arm 66 of this center lever 42 also has a ball 67 on its end.

The lower lever 38 is slidably and rotatably mounted on the cross shaft 40. The upper lever arm 68 can be made as long axially as needed to accommodate the shift tower to give the clearance desired. In the outer end of this arm 68 is the socket 70 adapted to receive the ball 67. The lower arm 71 of the lower lever carries the ball 37 also referred to herein as the shifting finger.

The clearance between the ends of the slidable levers 43 and 38 on their respective cross shafts 53 and 40 allows each lever to be moved coaxially as well as rotatively on its shaft.

Operation of the shift tower is as follows: Assume that the shift lever 14 is in neutral as shown in the drawings, the shift finger ball 37 is in the middle of the slots 36 in the members 33 and 34. To effect a shift the driver must move the ball 37 so it lies only within the desired one of the members 32, 33, 34 or 35. He does this by imparting a sidewise movement to the shift lever 14. The chain of action is best seen in Fig. 2 in the dotted lines with the ball 44 moved to the left which moved the upper sliding lever 43 along its shaft 53 and tilted the center lever 60 about its center 61 which also tilted the lower lever 38 about its shaft 40 and moved the shift finger ball 37 into the slot 36 in the member 33 on the shaft 21. The driver can now shift the gear 18 forward or aft as required. Suppose he desires to shift it into the forward or dotted line position in Fig. 1. He will pull back on the lever 14 thereby moving the levers 43, 42 and 38 into the dotted line positions shown in Fig. 2. The lower lever 38 moved axially along its shaft 40, the upper lever 43 rotated about its shaft 53 and the center lever 60 rotated in its ball socket mounting 62, 63. The levers translate the movement so that the ball 37 on the shift finger moves always in the same direction as the ball 44 on the shift lever 14.

A like identity of direction of movement of the shift finger ball 37 and the shift lever ball 44 is obtained by the combination of levers and the mounting arrangement shown in Figs. 4, 5 and 6 where like reference numerals have been used for the parts wherever possible.

In this modification the center lever 60 has been omitted and the upper lever 43 has been shifted so that the shaft 53 on which it slides axially is parallel to the shaft 40 on which the lower lever 38 slides. This modified arrangement is useful where the space permits of having an inclined shift tower case 72 instead of the vertical case 13 of Figs. 1 to 3. In this modification a ball 73 on the upper arm 74 replaces the socket 70 on the arm 68.

The movement of the shift lever 14 in a sidewise direction determines in which slot 36 of the members 32, 33, 34 and 35 the shift finger ball 37 will be put. Thus, if the lever 14 is moved to the left in Fig. 5, the ball 44 moves to the right, the ball 73 moves to the left, and the ball 37 moves to the right. It is important to note that the ball 44 moves in the same direction as the ball 37. The movement of the shift lever 14 in a fore and aft direction causes the ball 44 to move in the same direction as the ball 37 at the transmission.

I claim:

1. In a shift mechanism adapted to fit on an opening in the top of a transmission having beneath the opening a plurality of aligned gear shift members so that one member at a time can be selected for fore and aft movement, the combination of: a housing having a generally right angular shape forming a vertically extending housing portion with a gear shifting lever secured at its upper end and having a horizontally extending housing portion by which it is secured to said transmission; a horizontal supporting shaft extending fore and aft in and mounted in the lower horizontal portion of said housing; a lower lever journaled on said shaft for axial and rotative movement thereon, said lever having an upper vertical arm extending forward through the horizontal portion of said housing into position directly under the vertically extending portion of said housing, and having a lower vertical arm adapted to engage said gear shift members selectively; a horizontal supporting shaft extending at right angles to the first mentioned shaft and mounted in the upper end of the vertically extending portion of said housing; an upper lever journaled on said shaft for axial and rotative movement thereon, said lever having a vertical lower arm and having an upper vertical arm in position to be engaged and moved by the lower arm of said gear shifting lever; an intermediate substantially linear lever extending generally vertically in the vertically extending portion of said housing, a universal mounting secured in said housing for supporting said lever, and means on said lever for connecting its lower end to the upper arm of the lower lever and for connecting its upper end to the lower arm on the upper lever.

2. In a shift mechanism adapted to fit on an opening in the top of a transmission having beneath the opening a plurality of aligned gear shift members so that one member at a time can be selected for fore and aft movement, the combination of: a housing having a generally right angular shape forming a vertically extending housing portion with a gear shifting lever secured at its upper end and having a horizontally extending housing portion by which it is secured to said transmission; a horizontal supporting shaft extending fore and aft in and mounted in the lower horizontal portion of said housing; a lower lever journaled on said shaft for axial and rotative movement thereon, said lever having an upper arm extending forward through the horizontal portion of said housing into position directly under the vertically extending portion of said housing, and having a lower arm adapted to engage said gear shift members selectively; a horizontal supporting shaft mounted in the upper end of the vertically extending portion of said housing; an upper lever journaled on said shaft for axial and rotative movement thereon, said lever having its upper arm in position to be engaged and moved by the lower arm of said gear shifting lever; an intermediate lever extending generally vertically in the vertically extending portion of said housing, a universal mounting secured in said housing for supporting said lever, and means on said lever for connecting its lower end to the upper arm of the lower lever and for connecting its upper end to the lower arm on the upper lever.

3. In a shift mechanism adapted to fit on an opening in the top of a transmission having beneath the opening a plurality of aligned gear shift members so that one member at a time can be selected for fore and aft movement, the combination of: an upwardly and forwardly extending housing having a flanged opening in its lower end by which it is secured to the opening in said transmission and having a flanged opening in its upper end on which is fastened a manually operable gear shifting lever, said openings in said housing being spaced apart so that when viewed in plan the upper opening is forward of the lower opening; a pair of horizontal supporting shafts extending fore and aft in said housing and spaced one above the other; a lever journaled on each of said shafts for axial and rotative movement thereon, with the upper arm of the upper lever adapted to be engaged by the lower arm of the gear shifting lever, with the lower arm of the lower lever adapted to engage said gear shift members selectively and with the upper arm of the lower lever and the lower arm of the upper lever in operative engagement with each other.

4. In a shift mechanism adapted to fit on an opening in the top of a transmission having beneath the opening a plurality of aligned gear shift members so that one member at a time can be selected for fore and aft movement, the combination of: a generally vertically extending casing; a plurality of connected levers located serially on different levels from an uppermost lever to a lowermost lever, each said lever having a central rotatably-supported portion and a pair of generally vertical arms extending out from said central portion, an upper said arm extending upwardly and the other lower arm extending downwardly in each case, the lower arm of a higher lever being connected with the upper arm of a lower lever in each case, except for the upper arm of the uppermost lever and the lower arm of the lowermost lever; a supporting means in each case for rotatably supporting said central portion of each said lever; a shifting lever in engagement with the upper arm of said uppermost lever; and a shifting finger on the lower arm of said lowermost lever to engage in one of said gear shift members.

5. The device of claim 4 in which the supporting means for the uppermost lever and the supporting means for the lowermost lever each comprises a shaft horizontally mounted in said casing and on which said levers may be moved axially and rotatively to accomplish shifting of the gears in said transmission.

References Cited in the file of this patent

UNITED STATES PATENTS

| Number | Name | Date |
|---|---|---|
| 2,219,601 | Quartullo | Oct. 29, 1940 |
| 2,327,550 | Peterson | Aug. 24, 1943 |
| 2,547,317 | Gustafson | Apr. 3, 1951 |